United States Patent
Oren et al.

(10) Patent No.: US 9,130,613 B2
(45) Date of Patent: *Sep. 8, 2015

(54) DISTRIBUTED ANTENNA SYSTEM FOR MIMO TECHNOLOGIES

(75) Inventors: Yair Oren, Washington, DC (US); Igor Berlin, Potomac, MD (US); Ofer Saban, Meshek (IL); Isaac Shapira, Petach Tikav (IL); Rami Reuven, Rishon Lotzion (IL)

(73) Assignee: Corning Optical Communications Wireless Ltd, Airport (IL)

( * ) Notice: Subject to any disclaimer, the term of this patent is extended or adjusted under 35 U.S.C. 154(b) by 351 days.

This patent is subject to a terminal disclaimer.

(21) Appl. No.: 13/598,078

(22) Filed: Aug. 29, 2012

(65) Prior Publication Data

US 2012/0321314 A1    Dec. 20, 2012

Related U.S. Application Data

(63) Continuation of application No. 11/958,062, filed on Dec. 17, 2007, now Pat. No. 8,873,585.

(60) Provisional application No. 60/870,739, filed on Dec. 19, 2006.

(51) Int. Cl.
*H04W 4/00* (2009.01)
*H04B 7/216* (2006.01)
(Continued)

(52) U.S. Cl.
CPC .............. *H04B 7/0413* (2013.01); *H04B 7/022* (2013.01); *H04B 7/0602* (2013.01); *H04B 10/271* (2013.01)

(58) Field of Classification Search
CPC ...................................... H04B 7/0413
USPC ............................................. 370/328
See application file for complete search history.

(56) References Cited

U.S. PATENT DOCUMENTS 4,365,865 A    12/1982  Stiles
4,449,246 A     5/1984  Seiler et al.
(Continued)

FOREIGN PATENT DOCUMENTS

AU    645192 B    10/1992
AU    731180 B2    3/1998
(Continued)

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

(Continued)

*Primary Examiner* — Gerald Smarth
(74) *Attorney, Agent, or Firm* — C. Keith Montgomery

(57) ABSTRACT

The invention is directed to a method and system for supporting MIMO technologies which can require the transport of multiple spatial streams on a traditional Distributed Antenna System (DAS). According to the invention, at one end of the DAS, each spatial stream is shifted in frequency to a pre-assigned band (such as a band at a frequency lower than the native frequency) that does not overlap the band assigned to other spatial streams (or the band of any other services being carried by the DAS). Each of the spatial streams can be combined and transmitted as a combined signal over a common coaxial cable. At the other "end" of the DAS, the different streams are shifted back to their original (overlapping) frequencies but retain their individual "identities" by being radiated through physically separate antenna elements.

30 Claims, 3 Drawing Sheets

(51) Int. Cl.
  *H04B 7/04* (2006.01)
  *H04B 7/02* (2006.01)
  *H04B 7/06* (2006.01)
  *H04B 10/27* (2013.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang ............................. 359/124 |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,502,446 A | 3/1996 | Denninger .................... 342/357 |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,583,517 A | 12/1996 | Yokev et al. .................. 342/457 |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. ... 455/4.1 |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,828,658 A | 10/1998 | Ottersten et al. .............. 370/310 |
| 5,832,379 A | 11/1998 | Mallinckrodt ................ 455/427 |
| 5,835,857 A | 11/1998 | Otten ........................... 455/410 |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 5,995,832 A | 11/1999 | Mallinckrodt ................ 455/427 |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,049,705 A | 4/2000 | Xue ........................... 455/277.1 |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,198,432 B1 | 3/2001 | Janky ...................... 342/357.14 |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |

(56) References Cited

U.S. PATENT DOCUMENTS

| | | | |
|---|---|---|---|
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,393 B2 | 6/2003 | Holt .............. 342/453 |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,895,249 B2 | 5/2005 | Gaal .............. 455/456.1 |
| 6,909,399 B1 | 6/2005 | Zegelin et al. |
| 6,914,539 B2 | 7/2005 | Hoctor et al. ............ 340/870.12 |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,039 B2 | 2/2006 | Miyamoto et al. ............ 342/370 |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,023,382 B1 | 4/2006 | Akano .............. 342/386 |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |

(56) References Cited

U.S. PATENT DOCUMENTS

| | | | |
|---|---|---|---|
| 7,072,586 B2 | 7/2006 | Aburakawa et al. | |
| 7,082,320 B2 | 7/2006 | Kattukaran et al. | |
| 7,084,769 B2 | 8/2006 | Bauer et al. | |
| 7,092,726 B2 | 8/2006 | Shi et al. | 455/456.6 |
| 7,093,985 B2 | 8/2006 | Lord et al. | |
| 7,103,119 B2 | 9/2006 | Matsuoka et al. | |
| 7,103,377 B2 | 9/2006 | Bauman et al. | |
| 7,106,931 B2 | 9/2006 | Sutehall et al. | |
| 7,110,795 B2 | 9/2006 | Doi | |
| 7,114,859 B1 | 10/2006 | Tuohimaa et al. | |
| 7,123,939 B1 | 10/2006 | Bird et al. | 455/561 |
| 7,127,176 B2 | 10/2006 | Sasaki | |
| 7,142,503 B1 | 11/2006 | Grant et al. | |
| 7,142,535 B2 | 11/2006 | Kubler et al. | |
| 7,142,619 B2 | 11/2006 | Sommer et al. | |
| 7,160,032 B2 | 1/2007 | Nagashima et al. | |
| 7,171,244 B2 | 1/2007 | Bauman | |
| 7,184,728 B2 | 2/2007 | Solum | |
| 7,190,748 B2 | 3/2007 | Kim et al. | |
| 7,194,023 B2 | 3/2007 | Norrell et al. | |
| 7,199,443 B2 | 4/2007 | Elsharawy | |
| 7,200,305 B2 | 4/2007 | Dion et al. | |
| 7,200,391 B2 | 4/2007 | Chung et al. | |
| 7,228,072 B2 | 6/2007 | Mickelsson et al. | |
| 7,250,907 B2 | 7/2007 | Krumm et al. | 342/451 |
| 7,263,293 B2 | 8/2007 | Ommodt et al. | |
| 7,269,311 B2 | 9/2007 | Kim et al. | |
| 7,280,011 B2 | 10/2007 | Bayar et al. | |
| 7,286,843 B2 | 10/2007 | Scheck | |
| 7,286,854 B2 | 10/2007 | Ferrato et al. | |
| 7,295,119 B2 | 11/2007 | Rappaport et al. | |
| 7,310,430 B1 | 12/2007 | Mallya et al. | |
| 7,313,415 B2 | 12/2007 | Wake et al. | |
| 7,315,735 B2 | 1/2008 | Graham | |
| 7,324,730 B2 | 1/2008 | Varkey et al. | |
| 7,343,164 B2 | 3/2008 | Kallstenius | |
| 7,348,843 B1 | 3/2008 | Qiu et al. | |
| 7,349,633 B2 | 3/2008 | Lee et al. | |
| 7,359,408 B2 | 4/2008 | Kim | |
| 7,359,674 B2 | 4/2008 | Markki et al. | |
| 7,366,150 B2 | 4/2008 | Lee et al. | |
| 7,366,151 B2 | 4/2008 | Kubler et al. | |
| 7,369,526 B2 | 5/2008 | Lechleider et al. | |
| 7,379,669 B2 | 5/2008 | Kim | |
| 7,388,892 B2 | 6/2008 | Nishiyama et al. | |
| 7,392,025 B2 | 6/2008 | Rooyen et al. | |
| 7,392,029 B2 | 6/2008 | Pronkine | |
| 7,394,883 B2 | 7/2008 | Funakubo et al. | |
| 7,403,156 B2 | 7/2008 | Coppi et al. | |
| 7,409,159 B2 | 8/2008 | Izadpanah | |
| 7,412,224 B2 | 8/2008 | Kotola et al. | |
| 7,424,228 B1 | 9/2008 | Williams et al. | |
| 7,429,951 B2 | 9/2008 | Kennedy, Jr. et al. | 342/465 |
| 7,444,051 B2 | 10/2008 | Tatat et al. | |
| 7,450,853 B2 | 11/2008 | Kim et al. | |
| 7,450,854 B2 | 11/2008 | Lee et al. | |
| 7,451,365 B2 | 11/2008 | Wang et al. | |
| 7,454,222 B2 | 11/2008 | Huang et al. | |
| 7,460,507 B2 | 12/2008 | Kubler et al. | |
| 7,460,829 B2 | 12/2008 | Utsumi et al. | |
| 7,460,831 B2 | 12/2008 | Hasarchi | |
| 7,466,925 B2 | 12/2008 | Iannelli | |
| 7,469,105 B2 | 12/2008 | Wake et al. | |
| 7,477,597 B2 | 1/2009 | Segel | |
| 7,483,504 B2 | 1/2009 | Shapira et al. | 375/347 |
| 7,483,711 B2 | 1/2009 | Burchfiel | |
| 7,496,070 B2 | 2/2009 | Vesuna | |
| 7,496,384 B2 | 2/2009 | Seto et al. | |
| 7,505,747 B2 | 3/2009 | Solum | |
| 7,512,419 B2 | 3/2009 | Solum | |
| 7,522,552 B2 | 4/2009 | Fein et al. | |
| 7,539,509 B2 | 5/2009 | Bauman et al. | |
| 7,542,452 B2 | 6/2009 | Penumetsa | |
| 7,546,138 B2 | 6/2009 | Bauman | |
| 7,548,138 B2 | 6/2009 | Kamgaing | |
| 7,548,695 B2 | 6/2009 | Wake | |
| 7,551,641 B2 | 6/2009 | Pirzada et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,590,354 B2 | 9/2009 | Sauer et al. | |
| 7,593,704 B2 | 9/2009 | Pinel et al. | |
| 7,599,420 B2 | 10/2009 | Forenza et al. | |
| 7,599,672 B2 | 10/2009 | Shoji et al. | |
| 7,610,046 B2 | 10/2009 | Wala | |
| 7,630,690 B2 | 12/2009 | Kaewell, Jr. et al. | |
| 7,633,934 B2 | 12/2009 | Kubler et al. | |
| 7,639,982 B2 | 12/2009 | Wala | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,565 B2 | 2/2010 | Ylänen et al. | |
| 7,675,936 B2 | 3/2010 | Mizutani et al. | |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,697,574 B2 | 4/2010 | Suematsu et al. | |
| 7,715,375 B2 | 5/2010 | Kubler et al. | |
| 7,751,374 B2 | 7/2010 | Donovan | |
| 7,751,838 B2 | 7/2010 | Ramesh et al. | |
| 7,760,703 B2 | 7/2010 | Kubler et al. | |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,787,823 B2 | 8/2010 | George et al. | |
| 7,809,012 B2 | 10/2010 | Ruuska et al. | |
| 7,812,766 B2 | 10/2010 | Leblanc et al. | |
| 7,812,775 B2 | 10/2010 | Babakhani et al. | |
| 7,817,969 B2 | 10/2010 | Castaneda et al. | |
| 7,835,328 B2 | 11/2010 | Stephens et al. | |
| 7,848,316 B2 | 12/2010 | Kubler et al. | |
| 7,848,770 B2 | 12/2010 | Scheinert | |
| 7,853,234 B2 | 12/2010 | Afsahi | |
| 7,870,321 B2 | 1/2011 | Rofougaran | |
| 7,880,677 B2 | 2/2011 | Rofougaran et al. | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,907,972 B2 | 3/2011 | Walton et al. | |
| 7,912,043 B2 | 3/2011 | Kubler et al. | |
| 7,912,506 B2 | 3/2011 | Lovberg et al. | |
| 7,916,706 B2 | 3/2011 | Kubler et al. | |
| 7,917,177 B2 | 3/2011 | Bauman | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,936,713 B2 | 5/2011 | Kubler et al. | |
| 7,949,364 B2 | 5/2011 | Kasslin et al. | |
| 7,957,777 B1 | 6/2011 | Vu et al. | |
| 7,962,111 B2 | 6/2011 | Solum | |
| 7,969,009 B2 | 6/2011 | Chandrasekaran | |
| 7,969,911 B2 | 6/2011 | Mahany et al. | |
| 7,990,925 B2 | 8/2011 | Tinnakornsrisuphap et al. | |
| 7,996,020 B1 | 8/2011 | Chhabra | |
| 8,018,907 B2 | 9/2011 | Kubler et al. | |
| 8,023,886 B2 | 9/2011 | Rofougaran | |
| 8,027,656 B2 | 9/2011 | Rofougaran et al. | |
| 8,036,308 B2 | 10/2011 | Rofougaran | |
| 8,082,353 B2 | 12/2011 | Huber et al. | |
| 8,086,192 B2 | 12/2011 | Rofougaran et al. | |
| 8,873,585 B2 | 10/2014 | Oren et al. | |
| 2001/0036199 A1 | 11/2001 | Terry | |
| 2002/0003645 A1 | 1/2002 | Kim et al. | |
| 2002/0009070 A1 | 1/2002 | Lindsay et al. | |
| 2002/0012495 A1 | 1/2002 | Sasai et al. | |
| 2002/0048071 A1 | 4/2002 | Suzuki et al. | |
| 2002/0051434 A1 | 5/2002 | Ozluturk et al. | |
| 2002/0075906 A1 | 6/2002 | Cole et al. | |
| 2002/0085643 A1 | 7/2002 | Kitchener et al. | 375/267 |
| 2002/0092347 A1 | 7/2002 | Niekerk et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |

(56) References Cited

U.S. PATENT DOCUMENTS

| | | |
|---|---|---|
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. .................. 370/338 |
| 2004/0102196 A1 | 5/2004 | Weckstrom et al. ....... 455/456.1 |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0164902 A1 | 8/2004 | Karlsson et al. ............... 342/449 |
| 2004/0165568 A1 | 8/2004 | Weinstein ...................... 370/344 |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0041693 A1* | 2/2005 | Priotti ............................ 370/503 |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0046662 A1 | 3/2006 | Moulsley et al. .............. 455/69 |
| 2006/0056283 A1 | 3/2006 | Anikhindi et al. ............ 370/208 |
| 2006/0056327 A1 | 3/2006 | Coersmeier |
| 2006/0062579 A1 | 3/2006 | Kim et al. |
| 2006/0063494 A1 | 3/2006 | Zhang et al. ..................... 455/78 |
| 2006/0094470 A1 | 5/2006 | Wake et al. |
| 2006/0104643 A1 | 5/2006 | Lee et al. |
| 2006/0120395 A1* | 6/2006 | Xing et al. ...................... 370/431 |
| 2006/0128425 A1 | 6/2006 | Rooyen ....................... 455/552.1 |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189280 A1* | 8/2006 | Goldberg ...................... 455/101 |
| 2006/0189354 A1 | 8/2006 | Lee et al. |
| 2006/0203836 A1 | 9/2006 | Kim |
| 2006/0217132 A1 | 9/2006 | Drummond-Murray et al. .......................... 455/456.2 |
| 2006/0223439 A1* | 10/2006 | Pinel et al. ..................... 455/11.1 |
| 2006/0233506 A1 | 10/2006 | Noonan et al. |
| 2006/0239630 A1 | 10/2006 | Hase et al. |
| 2006/0262014 A1 | 11/2006 | Shemesh et al. .............. 342/386 |
| 2006/0268738 A1 | 11/2006 | Goerke et al. |
| 2006/0274704 A1 | 12/2006 | Desai et al. |
| 2006/0276227 A1 | 12/2006 | Dravida ....................... 455/562.1 |
| 2007/0009266 A1 | 1/2007 | Bothwell |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0104165 A1 | 5/2007 | Hanaoka et al. ............... 370/338 |
| 2007/0135169 A1 | 6/2007 | Sychaleun et al. ......... 455/562.1 |
| 2007/0149250 A1 | 6/2007 | Crozzoli et al. |
| 2007/0155314 A1 | 7/2007 | Mohebbi |
| 2007/0166042 A1 | 7/2007 | Seeds et al. |
| 2007/0173288 A1 | 7/2007 | Skarby et al. ................. 455/561 |
| 2007/0182626 A1 | 8/2007 | Samavati et al. ......... 342/357.06 |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. ................... 398/5 |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0005219 A1 | 1/2008 | Nabar et al. .................... 709/201 |
| 2008/0007453 A1 | 1/2008 | Vassilakis et al. |
| 2008/0013473 A1 | 1/2008 | Proctor, Jr. et al. ........... 370/315 |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |

(56) References Cited

U.S. PATENT DOCUMENTS

| | | |
|---|---|---|
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0087179 A1 | 4/2009 | Underwood et al. |
| 2009/0088071 A1 | 4/2009 | Rofougaran |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0175214 A1 | 7/2009 | Sfar et al. |
| 2009/0180407 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0239521 A1 | 9/2009 | Mohebbi |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316609 A1 | 12/2009 | Singh |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246541 A9 | 9/2010 | Kim |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |

FOREIGN PATENT DOCUMENTS

| | | | |
|---|---|---|---|
| CA | 2065090 C | 2/1998 | |
| CA | 2242707 A1 | 1/1999 | |
| DE | 20104862 U1 | 8/2001 | |
| DE | 10249414 A1 | 5/2004 | |
| EP | 0355328 A2 | 2/1990 | ............... H04B 7/08 |
| EP | 0477952 A2 | 4/1992 | |
| EP | 0477952 A3 | 4/1992 | |
| EP | 0709974 A1 | 5/1996 | ............... H04B 7/08 |
| EP | 0461583 B1 | 3/1997 | |
| EP | 851618 A2 | 7/1998 | |
| EP | 0687400 B1 | 11/1998 | |
| EP | 0938204 A1 | 8/1999 | ............... H07J 13/00 |
| EP | 0993124 A2 | 4/2000 | |
| EP | 1037411 A2 | 9/2000 | |
| EP | 1085684 A2 | 3/2001 | ............... H04B 17/00 |
| EP | 1179895 A1 | 2/2002 | |
| EP | 1267447 A1 | 12/2002 | |
| EP | 1347584 A2 | 9/2003 | |

(56) References Cited

FOREIGN PATENT DOCUMENTS

| | | | |
|---|---|---|---|
| EP | 1363352 A1 | 11/2003 | |
| EP | 1391897 A1 | 2/2004 | |
| EP | 1443687 A1 | 8/2004 | |
| EP | 1455550 A2 | 9/2004 | |
| EP | 1501206 A1 | 1/2005 | |
| EP | 1503451 A1 | 2/2005 | |
| EP | 1530316 A1 | 5/2005 | |
| EP | 1511203 B1 | 3/2006 | |
| EP | 1267447 B1 | 8/2006 | |
| EP | 1693974 A1 | 8/2006 | |
| EP | 1742388 A1 | 1/2007 | |
| EP | 1227605 B1 | 1/2008 | |
| EP | 1954019 A1 | 8/2008 | |
| EP | 1968250 A1 | 9/2008 | |
| EP | 1056226 B1 | 4/2009 | |
| EP | 1357683 B1 | 5/2009 | |
| GB | 2313020 A | 11/1997 | ............... H04B 7/06 |
| GB | 2323252 A | 9/1998 | |
| GB | 2399963 A | 9/2004 | |
| GB | 2428149 A | 1/2007 | |
| JP | H4189036 A | 7/1992 | |
| JP | 5-252559 | 9/1993 | ............... H04Q 7/04 |
| JP | 05252559 A | 9/1993 | |
| JP | 05260018 A | 10/1993 | |
| JP | 5-327569 | 12/1993 | ............... H04B 7/04 |
| JP | 5-327576 | 12/1993 | ............... H04B 7/26 |
| JP | 05327569 A | 12/1993 | |
| JP | 05327576 A | 12/1993 | |
| JP | 09083450 A | 3/1997 | |
| JP | 09162810 A | 6/1997 | |
| JP | 09200840 A | 7/1997 | |
| JP | 11068675 A | 3/1999 | |
| JP | 2000152300 A | 5/2000 | |
| JP | 2000341744 A | 12/2000 | |
| JP | 2002264617 A | 9/2002 | |
| JP | 2002353813 A | 12/2002 | |
| JP | 2003148653 A | 5/2003 | |
| JP | 2003172827 A | 6/2003 | |
| JP | 2004172734 A | 6/2004 | |
| JP | 2004245963 A | 9/2004 | |
| JP | 2004247090 A | 9/2004 | |
| JP | 2004264901 A | 9/2004 | |
| JP | 2004265624 A | 9/2004 | |
| JP | 2004317737 A | 11/2004 | |
| JP | 2004349184 A | 12/2004 | |
| JP | 2005018175 A | 1/2005 | |
| JP | 2005087135 A | 4/2005 | |
| JP | 2005134125 A | 5/2005 | |
| JP | 2007228603 A | 9/2007 | |
| JP | 2008172597 A | 7/2008 | |
| KR | 20010055088 A | 7/2001 | |
| WO | 9603823 A1 | 2/1996 | |
| WO | 9613102 A1 | 5/1996 | |
| WO | WO96/13102 | 5/1996 | ............... H04B 7/02 |
| WO | 9804054 A1 | 1/1998 | |
| WO | WO98/04054 | 1/1998 | ............... H04B 7/04 |
| WO | 9810600 A1 | 3/1998 | |
| WO | 0042721 A1 | 7/2000 | |
| WO | 0072475 A1 | 11/2000 | |
| WO | 0178434 A1 | 10/2001 | |
| WO | 0184760 A1 | 11/2001 | |
| WO | 0186755 A2 | 11/2001 | |
| WO | WO01/86755 A2 | 11/2001 | ............... H01Q 3/26 |
| WO | 0221183 A1 | 3/2002 | |
| WO | 0230141 A1 | 4/2002 | |
| WO | 02091618 A1 | 11/2002 | |
| WO | WO02/091618 A1 | 11/2002 | ............... H04B 7/00 |
| WO | 02102102 A1 | 12/2002 | |
| WO | 03024027 A1 | 3/2003 | |
| WO | 03098175 A1 | 11/2003 | |
| WO | 2004030154 A2 | 4/2004 | |
| WO | 2004047472 A1 | 6/2004 | |
| WO | 2004056019 A1 | 7/2004 | |
| WO | 2004059934 A1 | 7/2004 | |
| WO | 2004086795 A2 | 10/2004 | |
| WO | 2004093471 A2 | 10/2004 | |
| WO | 2004107783 A1 | 12/2004 | |
| WO | WO2004/107783 A1 | 12/2004 | ............... H04Q 7/30 |
| WO | 2005062505 A1 | 7/2005 | |
| WO | 2005069203 A2 | 7/2005 | |
| WO | 2005073897 A1 | 8/2005 | |
| WO | 2005079386 A2 | 9/2005 | |
| WO | 2005101701 A2 | 10/2005 | |
| WO | 2005111959 A2 | 11/2005 | |
| WO | 2006011778 A1 | 2/2006 | |
| WO | 2006018592 A1 | 2/2006 | |
| WO | 2006019392 A1 | 2/2006 | |
| WO | 2006039941 A1 | 4/2006 | |
| WO | 2006046088 A1 | 5/2006 | |
| WO | 2006051262 A1 | 5/2006 | |
| WO | 2006060754 A1 | 6/2006 | |
| WO | 2006105185 A2 | 10/2006 | |
| WO | WO2006/105185 A2 | 10/2006 | ............... H04B 1/38 |
| WO | 2006133609 A1 | 12/2006 | |
| WO | 2006136811 A1 | 12/2006 | |
| WO | WO2006/136811 A1 | 12/2006 | ............... H04B 10/12 |
| WO | 2007048427 A1 | 5/2007 | |
| WO | 2007077451 A1 | 7/2007 | |
| WO | 2007088561 A1 | 8/2007 | |
| WO | 2007091026 A1 | 8/2007 | |
| WO | 2007133630 A2 | 11/2007 | |
| WO | WO2007/133630 A2 | 11/2007 | ............... C01F 7/02 |
| WO | 2008008249 A2 | 1/2008 | |
| WO | 2008027213 A2 | 3/2008 | |
| WO | 2008033298 A2 | 3/2008 | |
| WO | 2008039830 A2 | 4/2008 | |
| WO | 2008116014 A2 | 9/2008 | |
| WO | 2010090099 A1 | 8/2010 | |
| WO | 2010090999 A1 | 8/2010 | |
| WO | 2010132739 A1 | 11/2010 | |
| WO | 2011100095 A1 | 8/2011 | |
| WO | 2011139939 A1 | 11/2011 | |
| WO | 2012148938 A1 | 11/2012 | |
| WO | 2012148940 A1 | 11/2012 | |
| WO | 2013009283 A1 | 1/2013 | |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transaction on Microwave Theory and Techniques, Aug. 1997, pp. 13290-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN—Used Helical Antenna Fully Integrated with the PCMCIA Carrier," IEEE Transactions on Antennas and Propagation, Dec. 2005, vol. 53, No. 12, pp. 4164-4168.

(56) References Cited

OTHER PUBLICATIONS

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 mailed Aug. 30, 2012, 10 pages.
International Search Report for PCT/US2010/022847 mailed Jul. 12, 2010, 3 pages.
International Search Report for PCT/US2010/022857 mailed Jun. 18,2010, 3 pages.

Decision on Appeal for U.S. Appl. No. 11/451,237 mailed Mar. 19, 2013, 7 pages.
Decision on Rejection for Chinese patent application 200780022093.6 mailed Feb. 5, 2013, 9 pages.
International Search Report and Written Opinion for International patent application PCT/US2007/013802 mailed May 8, 2008, 12 pages.
Bahl, et al., "Enhancements to the RADAR User Location and Tracking System," Microsoft Research Technical Report, Feb. 2000, pp. 1-13.
Frikel, et al., "A Robust Mobile Positioning Algorithm," EURASIP Proceedings, ISCCSP 2006, pp. 1-4.
Pahlavan, et al., "An Overview of Wireless Indoor Geolocation Techniques and Systems," LNCS 1818, pp. 1-13.
Wann, et al., "Hybrid TDOA/AOA indoor Positioning and Tracking Using Extended Kalman Filters," $63^{rd}$ IEEE VTC 2006, pp. 1058-1062.
Bahl et al., "Enhancements to the RADAR User Location and Tracking System," Microsoft Research Technical Report, Feb. 2000, pp. 1-13.
Frikel et al., "A Robust Mobile Positioning Algorithm," EURASIP Proceedings, ISCCSP 2006, pp. 1-4.
Pahlavan et al., "An Overview of Wireless Indoor Geolocation Techniques and Systems," LNCS 1818, pp. 1-13, 2000.
Wann et al., "Hybrid TDOA/AOA Indoor Positioning and Tracking Using Extended Kalman Filters," 63rd IEEE VTC 2006, pp. 1058-1062.
Written Opinion of International Searching Authority for PCT/US2007/025855 dated Jul. 2, 2009.
Written Opinion of International Searching Authority for PCT/US2007/025855 dated Mar. 19, 2008.
International Search Report for PCT/US2007/025855 dated Mar. 19, 2008.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

(56) References Cited

OTHER PUBLICATIONS

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 mailed Sep. 16, 2013, 3 pages.
Final Office Action for U.S. Appl. No. 12/712,758 mailed May 24, 2013, 17 pages.
Non-final Office Action for U.S. Appl. No. 12/712,758 mailed Jan. 10, 2012, 14 pages.
Examination Report for European patent application 07835803.3 mailed Aug. 13, 2013, 6 pages.
Extended European Search Report for patent application 10014262.9 mailed Mar. 14, 2011, 6 pages.
International Search Report and Written Opinion for PCT/US2012/034853 mailed Aug. 6, 2012, 12 pages.
International Search Report and Written Opinion for PCT/US2012/034855 mailed Jul. 26, 2012, 10 pages.
Written Opinion of the International Searching Authority for European patent application 11701916.6 mailed Sep. 21, 2012, 10 pages.
International Search Report for PCT/US2011/021799 mailed Apr. 6, 2011, 4 pages.
Examination Report for European patent application 10702806.0 mailed Sep. 12, 2013, 11 pages.
Non-final Office Action for U.S. Appl. No. 13/194,429 mailed Mar. 1, 2013, 22 pages.
Notice of Allowance for U.S. Appl. No. 13/194,429 mailed Jul. 9, 2013, 9 pages.
International Search Report for PCT/US2011/043405 mailed Apr. 25, 2012, 4 pages.
Non-final Office Action for U.S. Appl. No. 11/958,062 mailed Nov. 6, 2013, 16 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examination Report for European Patent Application No. 11733965.5 mailed Oct. 10, 2014, 6 pages.
Notice of Allowance for U.S. Appl. No. 14/242,139 mailed Oct. 22, 2014, 12 pages.
Defendants' Invalidity Contentions in *Corning Optical Communications Wireless Ltd.* V. *Solid, Inc. and Reach Holdings, LLC* in Case No. 5:14-cv-03750-PSG in United States District Court, Northern District of California, San Jose Division, Dated Dec. 5, 2014, 27 pages. (Redacted).
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

* cited by examiner

DISTRIBUTED ANTENNA SYSTEM FOR MIMO TECHNOLOGIES

PRIORITY APPLICATION

This is a continuation of U.S. patent application Ser. No. 11/958,062 filed on Dec. 17, 2007, now U.S. Pat No. 8,873, 585 and entitled "Distributed Antenna System for MIMO Technologies," which claims the benefit of priority under 35 U.S.C. §119 of U.S. Provisional Application No. 60/870,739 filed Dec. 19, 2006, the contents of which are relied upon and incorporated herein by reference in their entireties.

STATEMENT REGARDING FEDERALLY SPONSORED RESEARCH

Not Applicable.

REFERENCE TO MICROFICHE APPENDIX

Not Applicable.

BACKGROUND

Technical Field of the Invention

The present invention is directed to Distributed Antenna Systems and more particularly, to methods and systems for transmitting multiple signals or spatial streams over the same RF frequencies using a Distributed Antenna System ("DAS").

The present invention is directed to a DAS intended to support wireless services employing MIMO technologies, such as a WiMax network. Traditionally, a base station connected to a DAS transmits a single signal (one or more RF carriers) within a frequency band. In the case of a MIMO-enabled base station, multiple signals, often referred to as spatial streams, are transmitted on the same RF frequencies. In order for a DAS to adequately support the distribution of this service, it needs to carry the multiple spatial streams to each radiating point, and at each radiating point radiate (and receive) the different streams on separate antenna elements.

One challenge for a traditional DAS architecture in addressing these requirements is that a traditional DAS carries signals at their native RF frequency. Therefore carrying multiple signals at the same frequency (namely the multiple spatial streams) may require the deployment of parallel systems.

SUMMARY OF THE INVENTION

In referring to the signal flows in DAS systems, the term Downlink signal refers to the signal being transmitted by the source transmitter (e.g. cellular base station) through an antenna to the terminals and the term Uplink signal refers to the signals being transmitted by the terminals which are received by an antenna and flow to the source receiver. Many wireless services have both an uplink and a downlink, but some have only a downlink (e.g. a mobile video broadcast service) or only an uplink (e.g. certain types of medical telemetry).

In accordance with the invention, multiple spatial streams are transported on a traditional DAS architecture whereby, at the input end, each spatial stream is shifted in frequency to a pre-assigned band (such as a band at a frequency lower than the native frequency) that does not overlap the band assigned to other spatial stream (or the band of any other services being carried by the DAS). At the other "end" of the DAS, the different streams are shifted back to their original (overlapping) frequencies but retain their individual "identities" by being radiated through physically separate antenna elements. In one embodiment, frequency shifting can be implemented using frequency mixers.

Most wireless services of interest in this context are bi-directional, meaning they have both a Downlink (signals transmitted from Base station to terminals) and an Uplink (signal transmitted from terminal to Base station). Some wireless technologies operate in FDD (Frequency division duplexing) mode, meaning Downlink (DL) and Uplink (UL) operate simultaneously on different frequencies, while others operate in TDD (Time division duplexing) mode, meaning DL and UL alternate in time using the same frequency bands.

The cabling technologies used in a DAS can differ in the way they transfer DL and UL on the same medium (e.g., cable or fiber). Fiber links can use a separate fiber strand (or wavelength in WDM systems) for UL and DL. Therefore, Fiber links can easily support both FDD and TDD modes.

Coax links usually use a single cable for both DL and UL. For FDD services, this does not present a problem since the DL and UL signals can use different frequencies. For TDD services, two different embodiments can be used. In one embodiment, a separate frequency for DL and UL can be used (meaning one or both of the DL and UL need to be shifted from their native, overlapping frequencies to non-overlapping frequencies). In an alternative embodiment, a switching mechanism can be used to alternate the DL and the UL transmission on the same frequency. This embodiment has the advantage of using less spectrum resources, allowing other services (at other frequencies) to run on the same cable.

These and other capabilities of the invention, along with the invention itself, will be more fully understood after a review of the following figures, detailed description, and claims.

DESCRIPTION OF THE INVENTION

In accordance with the invention, a method and system can be implemented in a DAS architecture which uses both fiber links and coax links, for a MIMO service using 2 or more spatial streams and operating in TDD mode. Other configurations, such as those supporting 3 or more special streams, would require simple variations on the scheme presented below.

Figure 1:
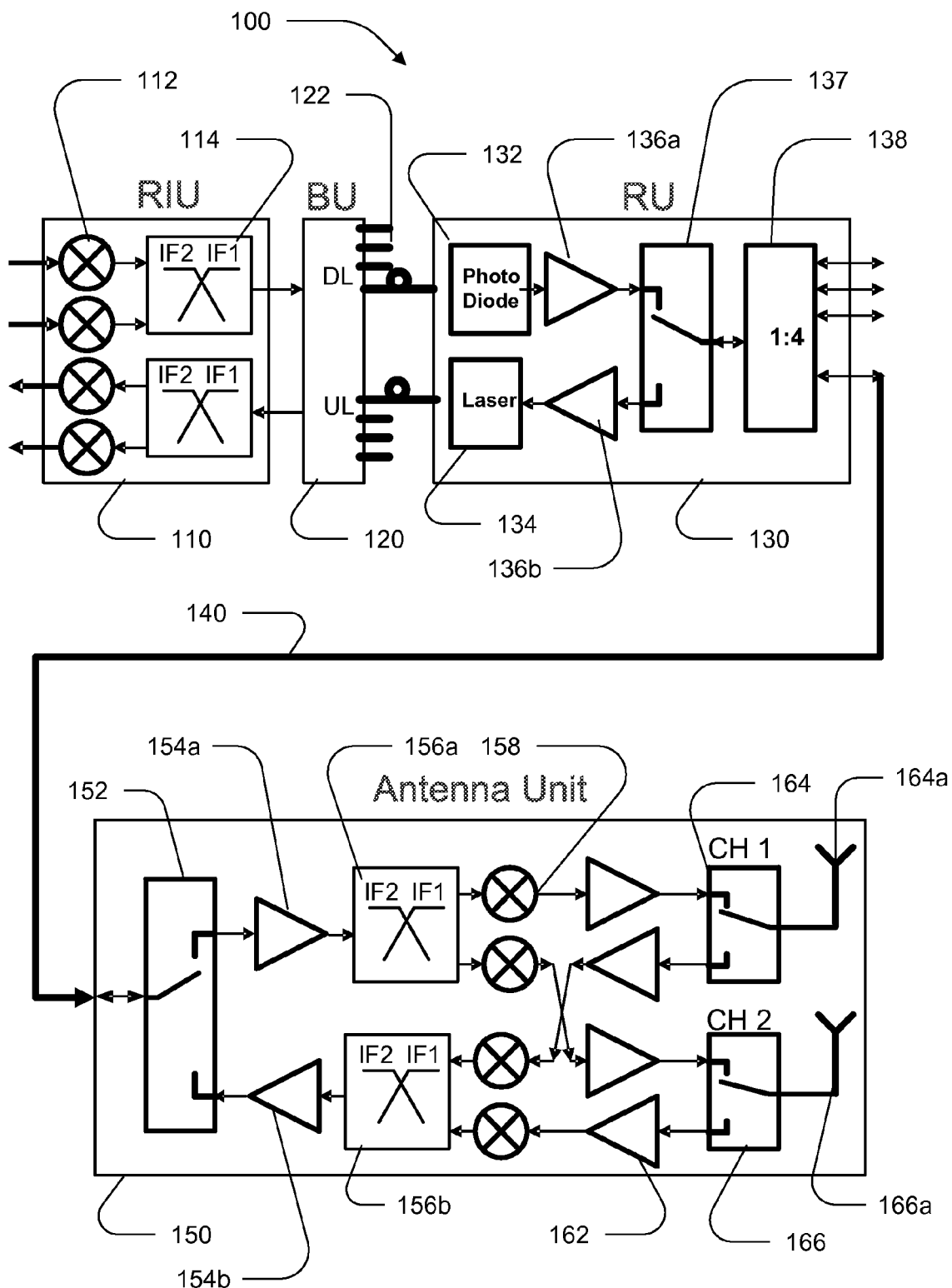
FIG. 1 is a block diagram of an embodiment of a distributed antenna system according to the invention.

FIG. 1 shows an example of a DAS 100 in accordance with the invention. The DAS can include a Radio Interface Unit (RIU) 110, a Base Unit (BU) 120, a Remote Unit (RU) 130 and an Antenna Unit (AU) 150.

The RIU 110 provides the interface to the Base station (BTS, not shown). In this embodiment, the RIU has two DL connections from the BTS and two UL connections to the BTS, however a single DL/UL connection or more than two DL and UL connections can be carried by the system. The RIU 110 can include a mixer 112 on each DL connection and a mixer 112 on each UL connection. The RIU 110 can implement the frequency shifting ("down-converting") for the multiple DL spatial stream signals, mapping each to a different non-overlapping frequency band. For example the DL signals can be down-converted from the WiMAX 2.5 GHz-2.7 GHz frequency bands to the 100 MHz-300 MHz frequency band or the 320 MHz-520 MHz frequency band. It implements the opposite for the UL signals. The mixers 112 can change the signal frequency on each DL connection to a different non-overlapping frequency band so that all the signals can be carried on the same cable without interference. The duplexer 114a combines the DL connections (which use different frequency bands) onto a common cable and can output the signals to the BU 120.

Similarly, the UL signals received from the BU 120 can be input into a de-duplexer 114b, which separates the UL into separate connections. Each of UL connections can be input to a mixer 112 and converted back to their original or native frequency bands for transmission back to the BTS. For example, the UL signals can be up-converted from the 100 MHz-300 MHz frequency band or the 320 MHz-520 MHz frequency band to the WiMAX 2.5 GHz-2.7 GHz frequency. In an alternative embodiment the same frequencies can be shared for DL and UL and the same circuits and mixers can be used for both DL & UL, alternating in time. In accordance with the invention, where the same frequencies are shared by the DL and UL, the same circuits and mixers can be used for both the DL and UL signal paths, alternating in time using, for example, time division multiplexing.

The BU 120 can convert the DL RF signal to an optical signal and split that signal into multiple optical links 122 which can be connected to multiple Remote Units RUs 150. The BU 120 implements the opposite for UL signals. The BU 120 allows the signals to be distributed, for example, to multiple buildings of campus wide network or multiple floors of a building. The BU 120 can be a dual point to multi-point device that converts an input RF DL signal in to multiple optical output signals, for example to transmit the signals over a fiber-optic link 122 and receives multiple optical input signals and combines them onto a single RF UL signal. One example of a BU 120, is a Mobile Access Base Unit above from MobileAccess Networks, Inc., of Vienna, Va.

The RIU 110 and BU 120 can be co-located and, optionally, can be combined into a single physical element or component. Where the RIU 110 and the Bu 120 are co-located, coaxial cable or twisted pair copper wire can be used to interconnect the units.

The RUs 130 can be located in wiring closets in different areas (e.g. floors) of a building. The RU 130 can include a media converting component 132, 134 for converting optical signals to electronic signals (DL connection) and electronic signals to optical signals (UL connection), amplifiers 136a, 136b for amplifying the signals as necessary, a time division duplexing (TDD) switching mechanism 137 for combining the DL and UL signals on a common transmission medium, and a multiplexer 138 for splitting the signal for transmission to multiple antennae and receiving signals from multiple antennae. For the DL connection, the RU 130 can transform the signals from optical to RF, be processed by the TDD switching mechanism 137, and using the multiplexer 138, split the signals onto multiple coaxial cables 140 going to multiple Antenna Units 150. The RU 130 implements the opposite for UL signals. In addition the RU can provide powering over the coax cables to the antenna units.

On the DL connection, the RU 130 can include a photo diode based system 132 for converting the optical signal to an RF signal. An amplifier 136a can be provided to adjust the amplitude of the signal before it is input into a time division duplexing (TDD) switch 137. The TDD switch 137 can be connected to a multiplexer 138 which can connect the DL connection to multiple Antenna Units AU 150 over a cable 140, such as a coaxial cable.

On the UL connection, the RU 130 receives RF signals from one or more Ails 150 and inputs each signal into multiplexer 138 which multiplexes the UL signals onto a single connection. The single UL connection can be fed into the TDD switch 137. The TDD switch 137 separates the UL connection from the DL connection and converts the UL signal to an optical signal. An amplifier 136b can be provided to adjust the amplitude of the signal before transmission to the BU 120. The RU 130 can include a laser based optical system 134 for converting the electrical signals to optical signals.

The Antenna Units (AU) 150 can be located in the ceilings of the building. For the DL, the AU 150 implements the TDD mechanism 152 separating the DL and UL signals (opposite the RU 130), up-converts the two or more spatial channels to their native frequencies and transmits each on a dedicated antenna element, with appropriate amplification. For the UL connection, the AU 150 implements the opposite for UL signals. The UL signals received from the antenna elements 164A, 166A are amplified 162 as necessary and then down-converted by mixers 158 from their native frequencies to a non-overlapping intermediate frequency and combined onto a single line by duplexer 156b for transmission back to the RU 130.

The AU 150 can include a TDD switch mechanism 152 for duplexing and deduplexing (combining and separating) the UL connections and the DL connections, an amplifier for the DL connections 154a and the UL connections 154b, a deduplexer 156a for recovering the two DL connections, a duplexer 156b for combining the two UL connections, a mixer 158 for each DL connection for restoring the RF frequency of the signal for transmission to the antenna 164A, a mixer 158 for each UL connection for converting the RF frequency of each UL connection to different, non-overlapping frequency bands, amplifiers 162 for each of the DL and UL connection, a TDD switching mechanism 164 for channel 1 which connects the RF signal to antenna 164A and a TDD switching mechanism for channel 2 which connects the RF signal to antenna 166A.

For the DL, the AU 150 implements the opposite of the RU 130 in that it de-duplexes the signal into two or more spatial stream and up-converts the two or more spatial streams to the native frequency for transmission on a dedicated antenna element, with the appropriate amplification. For the UL, the AU 150 down-converts the two or more spatial streams to a lower frequency band and duplexes them onto a single cable for transmission to the RU 130.

When the frequencies used for transport through the DAS (the "down-converted" signals) are relatively low, it is possible to use low cost cabling such as Multi-mode fiber and CATV-grade coax (e.g. RG-11 or RG-6). For example, the down-converted signals can be in the 100 MHz-300 MHz and 320 MHz-520 MHz frequency bands.

Figure 2:
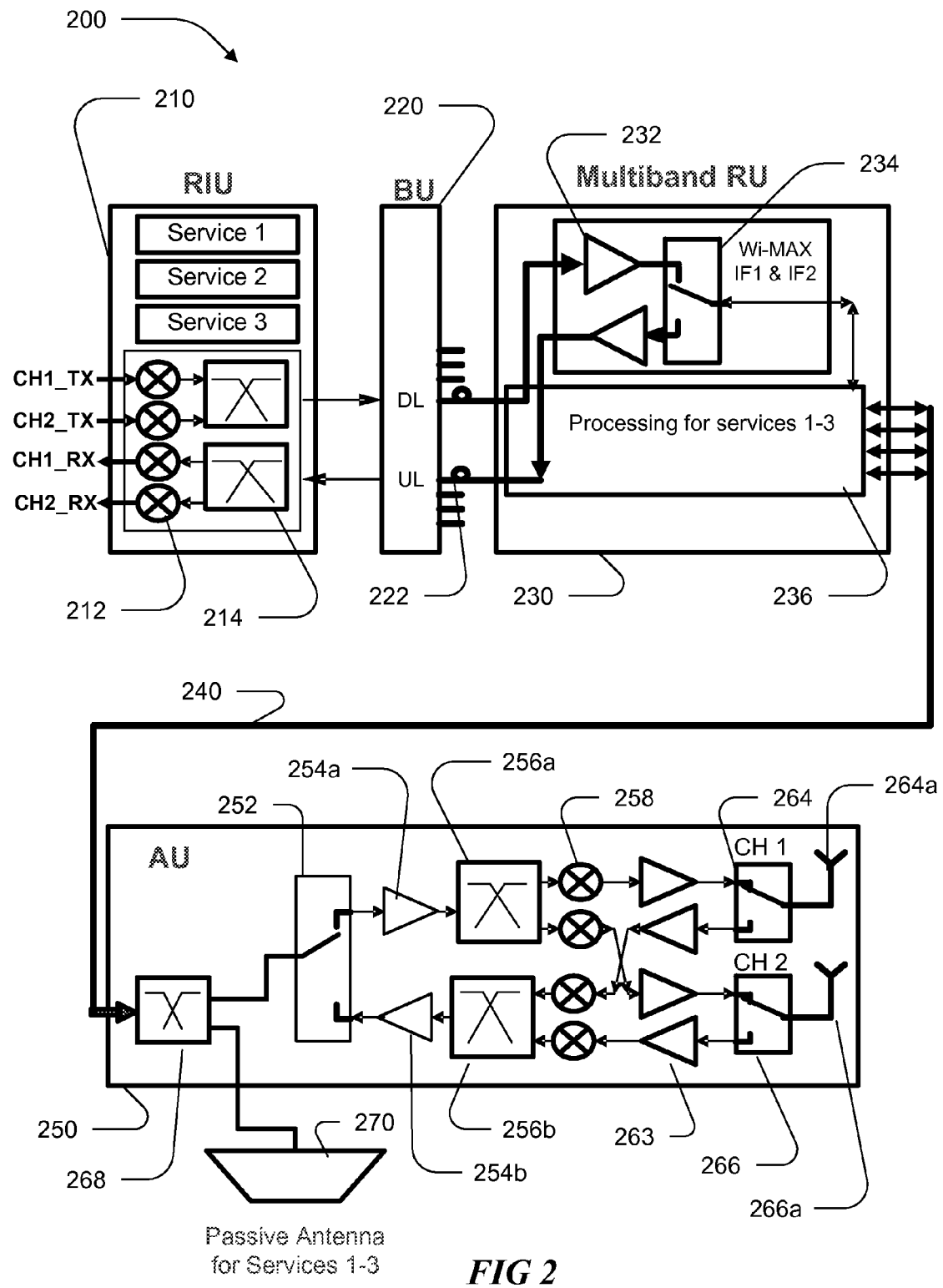
FIG. 2 is a block diagram of an alternate embodiment of a distributed antenna system according to the invention.

As shown in FIG. 2, the present invention can also be used to combine other services, such as non-MIMO services, on the same system, with the same cabling infrastructure. Additional MIMO bands can be handled in the same way, and they would be transported using additional non-overlapping frequency bands with respect to the frequency bands used for the first MIMO service. Non-MIMO bands can be transported at their native frequency and amplified at the RU, using passive antenna elements to radiate them at the AU.

In an embodiment similar to FIG. 1, FIG. 2 shows an embodiment of the present invention combined with other services. The DAS 200 includes a Radio Interface Unit (RIU)

210, a Base Unit (BU) 220, a Multiband Remote Unit (RU) 230 and an Antenna Unit (AU) 250.

The RIU 210 can include two or more spatial stream inputs from BTS (not shown) and any number of other services, for example, Service 1, Service 2, and Service 3. As described above with regard to FIG. 1, mixers 212 can be used to down-convert the DL connection and up-convert the UL connection, and a duplexer/de-duplexer 214 can be use can be used to combine the DL streams and separate the UL streams. The RIU 210 sends the DL signals to the BU 220 and receives the UL signals from the BU 220.

The other services can include any other service that uses frequency bands that do not interfere with the frequency bands already used by the system. In one embodiment of the invention, the spatial streams on Channel 1 and Channel 2 provide WiMAX network services in the 2.5-2.7 GHz frequency band and the other services can include, for example, CDMA based services (e.g. in the 1.9 GHz PCS band) and iDEN based services (e.g. in the 800 MHz and 900 MHz bands).

The BU 220 can be same as described above and shown in FIG. 1. The BU 220 can be any device that converts the DL RF signal to an optical signal and splits the signal to feed multiple optical links and combines the UL optical signals received over multiple optical links and converts the UL optical signals into RF signals.

In accordance with the embodiment shown in FIG. 2, the Multiband RU 230 receives the DL optical signals from the BU 220 and sends UL optical signals to the BU 220. The processing block 236 can include the components of FIG. 1, including the photo diode based system for converting the DL optical signals back to RF signals and the laser based system for converting the UL RF signals to optical signals and amplifiers for adjusting the signal amplitude as necessary. The processing block 236 can also include duplexer/de-duplexer system for combining the DL RF signals with the signals for the other services and separating the UL RF signals from the signals for other services. The processing block 236 can also include a multiplexer for splitting the combined DL signal to be transmitted to multiple antenna units 250 and for combining the individual UL signals received from the multiple antenna units 250.

The AU 250 of FIG. 2 is similar to the AU 150 of FIG. 1, in that it includes a TDD switching system 252, amplifiers 254a and 254b, de-duplexer 256a, duplexer 256b, mixers 258, amplifiers 262, TDD switching system 264, TDD switching system 266, antenna 264a and antenna 266a. In addition, AU 250 includes duplexer/de-duplexer 268 which separates the signals for the other services from DL RF signal and feeds the signals for the other services to passive antenna 270 and the spatial streams to TDD switching system 252. For the UL signals, the duplexer/de-duplexer 268 combines the signals for the other services with the spatial streams in order to send them to the Multiband RU 230.

In cases where significant capacity is required in a facility covered by a DAS, multiple base-stations (or multiple sectors on a single base station) can be used to "feed" the DAS, where each segment of the DAS can be associated with one of the base stations/sectors. In order to provide additional flexibility in assigning capacity to areas in the facility, it is desirable to be able to independently associate each AU with any one of the base stations/sectors.

In accordance with one embodiment of the invention, the RIU can have multiple, separate interfaces for each base station/sector (2 spatial streams from each in the 2-way MIMO example discussed above). The RIU can map each pair of signals from each base station/sector to a different pair of bands, non-overlapping with the bands assigned to other base stations/sectors. The BU and RU can retain the same functionality as above. The AU can have the ability using software to select the specific sector to use, based on tuning to the respective frequency bands.

However, one of the disadvantages of the approach described in the previous paragraph is that multiple blocks of spectrum are required on the link between the RU 130,230 and the AU 150,250 in order to support multiple sectors. This reduces the amount of spectrum available to support other services.

Figure 3:
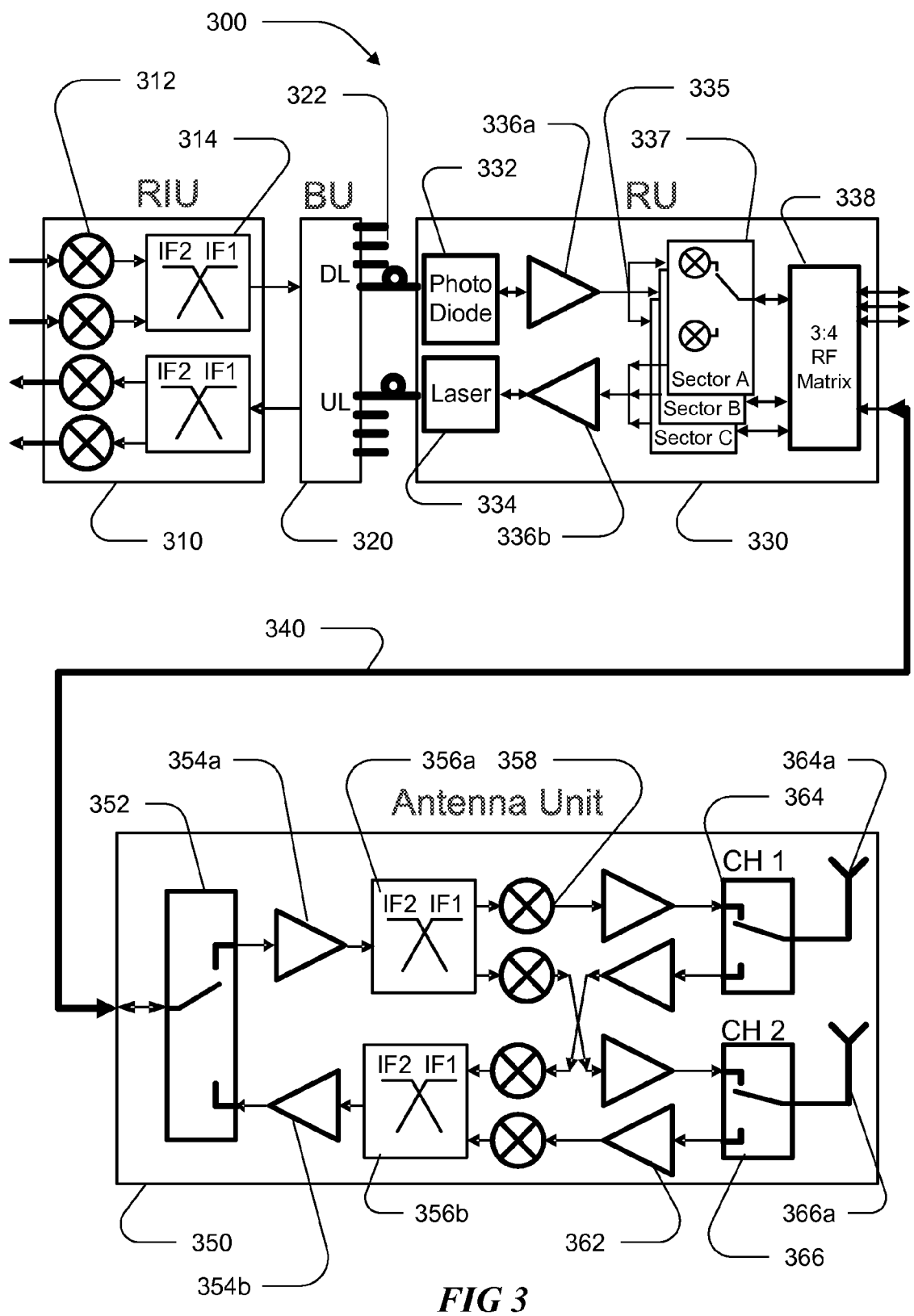
FIG. 3 is block diagram of an alternative embodiment of a distributed antenna system according to the invention.

As shown in FIG. 3, in accordance with an alternative embodiment of the invention, the system can maintain the same flexibility of association of sectors to antennas and the functionality of the RIU is as described above (mapping each sector to a different frequency band). The RU 330 can map all sectors to the same frequency band and use a switch 335 to select the sector to be associated with each of its ports and each port being connected over a separate coax cable to a specific AU 350. In this embodiment, the amount of spectrum consumed on the coax under this scheme is the amount required to support a single sector, regardless of the number of sectors supported in the full system.

The embodiment of FIG. 3 is similar to FIGS. 1 and 2 above. The RIU 310 can be connected to one or more BTS units (not shown). The RIU 310 can include mixers 312 and duplexer/de-duplexers 314 and be coupled to the BU 320 over a DL connection and an UL connection. The BU 320 can be the same as BU 120 and BU 220 as describe above. Further, each antenna unit AU 350 can be the same as AU 150 or AU 250 as described above.

The RU 330 can be similar to RU 130 and RU 230, and include a photo diode based system 332 for converting the DL optical signals to RF signal and a laser based system 334 for converting the UL RF signals to optical signals, along with amplifiers 336a, 336b to for adjusting the signal as needed.

For the DL spatial streams, the RU 330 includes a switch 335 which selectively connects a particular DL spatial stream to one of set of TDD switching systems 337 which is associated with a particular sector and uses multiplexer 338 to connect each sector to one or more antenna units AU 350. Each TDD switching system 337 can include a DL mixer for converting the DL spatial stream to a common frequency band and an UL mixer for converting the UL spatial stream from the common frequency band to the initial received frequency band. Each AU 350 can be configured to communicate using the common frequency band. The common frequency band can be selected based on environmental conditions and the distances of the runs of cable 340 for the system. The common frequency can be the same as the most common frequency used the RIU for converting the spatial streams, so no conversion is required for some signals (the most common) thus reducing the power requirements and potential for signal distortion on the most common signals.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

We claim:

1. A distributed antenna system for distributing MIMO signals for at least one MIMO service in a distributed antenna system (DAS), comprising:
   a) a remote unit configured to receive and distribute non-overlapping frequency MIMO downlink signals of at least one MIMO service;
   b) at least one antenna unit configured to receive the non-overlapping frequency MIMO downlink signals of the at least one MIMO service and frequency shift the non-overlapping frequency MIMO downlink signals into native frequency MIMO downlink signals;
   c) a single coaxial cable used to carry the non-overlapping frequency MIMO downlink signals of the at least one MIMO service between the remote unit and the at least one antenna unit;
   wherein the at least one antenna unit is operatively coupled to at least two MIMO antennas, the at least one antenna unit is configured to transmit the native frequency MIMO downlink signals via the at least two MIMO antennas.

2. The distributed antenna system of claim 1, further comprising a radio interface unit configured to receive native frequency MIMO downlink signals and communicate the non-overlapping frequency MIMO downlink signals to the remote unit.

3. The distributed antenna system of claim 2, wherein non-overlapping frequency MIMO downlink signals are comprised of non-overlapping frequency MIMO downlink electrical signals.

4. The distributed antenna system of claim 3, wherein the radio interface unit is further configured to convert the non-overlapping frequency MIMO downlink electrical signals into non-overlapping frequency MIMO downlink optical signals to be communicated to the remote unit.

5. The distributed antenna system of claim 4, wherein the radio interface unit is comprised of a radio interface unit downlink converter configured to convert the non-overlapping frequency MIMO downlink electrical signals into non-overlapping frequency MIMO downlink optical signals to be communicated to the remote unit.

6. The distributed antenna system of claim 4, further comprising at least one fiber optic link for carrying the non-overlapping frequency MIMO downlink optical signals between the radio interface unit and the remote unit.

7. The distributed antenna system of claim 6, wherein the at least one fiber optic link is comprised of at least one multi-mode fiber optic link.

8. The distributed antenna system of claim 4, wherein the remote unit further comprises a downlink converter configured to convert the non-overlapping frequency MIMO downlink optical signals back to the non-overlapping frequency MIMO downlink electrical signals.

9. The distributed antenna system of claim 2, wherein the radio interface unit further comprises at least two radio interface unit downlink frequency shifters configured to frequency shift the native frequency MIMO downlink signals to the non-overlapping frequency MIMO downlink signals.

10. The distributed antenna system of claim 9, wherein the at least two radio interface unit downlink frequency shifters are comprised of a first radio interface unit downlink frequency shifter configured to frequency shift a first native frequency MIMO downlink signal among the native frequency MIMO downlink signals from the native frequency to a first non-overlapping frequency MIMO downlink signal.

11. The distributed antenna system of claim 10, wherein the at least two radio interface unit downlink frequency shifters are further comprised of a second radio interface unit downlink frequency shifter configured to frequency shift a second native frequency MIMO downlink signal among the native frequency MIMO downlink signals from the native frequency to a second non-overlapping frequency MIMO downlink signal having a different frequency from the first non-overlapping frequency.

12. The distributed antenna system of claim 9, wherein the at least two radio interface unit downlink frequency shifters are configured to frequency shift the native frequency MIMO downlink signals to non-overlapping frequency MIMO downlink signals having non-overlapping frequencies in a frequency range of 320 MHz to 520 MHz.

13. The distributed antenna system of claim 9, wherein the at least one antenna unit comprises at least two antenna unit downlink frequency shifters configured to frequency shift the non-overlapping frequency MIMO downlink signals to the native frequency MIMO downlink signals.

14. The distributed antenna system of claim 13, wherein the at least two antenna unit downlink frequency shifters are comprised of a first antenna unit downlink frequency shifter configured to frequency shift a first non-overlapping frequency MIMO downlink signal among the non-overlapping frequency MIMO downlink signals to a first native frequency MIMO downlink signal.

15. The distributed antenna system of claim 14, wherein the at least two antenna unit downlink frequency shifters are further comprised of a second antenna unit downlink frequency shifter configured to frequency shift a second non-overlapping frequency MIMO downlink signal among the non-overlapping frequency MIMO downlink signals to a second native frequency MIMO downlink signal.

16. The distributed antenna system of claim 15, wherein the at least one antenna unit further comprises an antenna unit downlink splitter configured to split the non-overlapping frequency MIMO downlink signals into the first non-overlapping frequency MIMO downlink signal and the second non-overlapping frequency MIMO downlink signal.

17. The distributed antenna system of claim 15, wherein the at least one antenna unit is further configured to communicate the first native frequency MIMO downlink signal to a first MIMO antenna among the at least two MIMO antennas, and communicate the second native frequency MIMO downlink signal to a second MIMO antenna among the at least two MIMO antennas.

18. The distributed antenna system of claim 2, wherein the radio interface unit further comprises a splitter configured to split the non-overlapping frequency MIMO downlink signals into multiple non-overlapping frequency MIMO downlink signals to be communicated to each of a plurality of the remote units.

19. The distributed antenna system of claim 1, wherein the remote unit further comprises a splitter configured to split the received non-overlapping frequency MIMO downlink signals into a plurality of the non-overlapping frequency MIMO downlink signals to be communicated to the at least one antenna unit.

20. The distributed antenna system of claim 1, wherein the at least one MIMO service operates in a MIMO frequency domain division (FDD).

21. The distributed antenna system of claim 1, wherein the at least one antenna unit is comprised of a plurality of antenna units, and
   wherein the remote unit is configured to distribute the non-overlapping frequency MIMO downlink signals over dedicated single coaxial cables to the plurality of antenna units.

22. The distributed antenna system of claim 1, wherein the at least one MIMO service comprises at least one WiMAX service.

23. The distributed antenna system of claim 22, wherein the at least one WiMAX service includes the native frequency MIMO downlink signals in the 2.5-2.7 GHz frequency band.

24. The distributed antenna system of claim 1, wherein the at least one MIMO service comprises at least one CDMA service.

25. The distributed antenna system of claim 24, wherein the at least one CDMA service includes the native frequency MIMO downlink signals in the 1.9 GHz PCS band.

26. The distributed antenna system of claim 1, wherein the at least one MIMO service comprises at least one iDEN-based service.

27. The distributed antenna system of claim 26, wherein the at least one iDEN-based service includes the native frequency MIMO downlink signals in the 800-900 MHz frequency bands.

28. The distributed antenna system of claim 26, wherein the at least one iDEN-based service includes the native frequency MIMO downlink signals in the 900-1000 MHz frequency bands.

29. The distributed antenna system of claim 1, wherein the at least one MIMO service comprises a WiMAX service and a CDMA service.

30. The distributed antenna system of claim 1, wherein the at least one MIMO service comprises a WiMAX service and an iDEN-based service.

\* \* \* \* \*